United States Patent
Metge et al.

(10) Patent No.: US 11,280,217 B2
(45) Date of Patent: Mar. 22, 2022

(54) PRESSURIZED-AIR SUPPLY UNIT FOR AN AIR-JET COOLING DEVICE

(71) Applicant: SAFRAN AIRCRAFT ENGINES, Paris (FR)

(72) Inventors: Pierre Jean-Baptiste Metge, Moissy-Cramayel (FR); Ghislain Hervé Abadie, Moissy-Cramayel (FR); Alexandre Corsaut, Moissy-Cramayel (FR); Fabien Stéphane Garnier, Moissy-Cramayel (FR); Driss Karim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/273,665

(22) PCT Filed: Sep. 6, 2019

(86) PCT No.: PCT/FR2019/052047
§ 371 (c)(1),
(2) Date: Mar. 4, 2021

(87) PCT Pub. No.: WO2020/049259
PCT Pub. Date: Mar. 12, 2020

(65) Prior Publication Data
US 2021/0396152 A1 Dec. 23, 2021

(30) Foreign Application Priority Data
Sep. 6, 2018 (FR) ...................................... 1858021

(51) Int. Cl.
*F01D 25/00* (2006.01)
*F01D 25/14* (2006.01)
(Continued)

(52) U.S. Cl.
CPC .............. *F01D 25/14* (2013.01); *F01D 25/12* (2013.01); *F01D 25/243* (2013.01); *F02C 7/18* (2013.01);
(Continued)

(58) Field of Classification Search
CPC ........ F01D 24/12; F01D 24/14; F01D 24/243; F02C 7/18; F05D 2220/323;
(Continued)

(56) References Cited

U.S. PATENT DOCUMENTS 5,205,115 A * 4/1993 Plemmons ............... F01D 11/24
60/806
6,035,929 A * 3/2000 Friedel ..................... F01D 11/24
165/168
(Continued)

FOREIGN PATENT DOCUMENTS

EP 3 318 725 A1 5/2018
FR 3 040 428 A1 3/2017
FR 3 050 228 A1 10/2017

*Primary Examiner* — Phutthiwat Wongwian
*Assistant Examiner* — Sherman D Manley
(74) *Attorney, Agent, or Firm* — Birch, Stewart, Kolasch & Birch, LLP

(57) ABSTRACT

The invention relates to a pressurized-air supply unit for an air-jet cooling device cooling an outer casing of a turbomachine turbine. This unit is notable in that it is monobloc, in that it comprises: —a body which has an interior wall provided with air-ejection perforations, an exterior wall and outlet ducts which are configured to be coupled to cooling lines of the cooling device, —an elbowed air-conveying pipe coupled by its outlet opening to said exterior wall of the body, and in that said unit comprises at least one air-distribution partition, arranged in the outlet opening and connecting the internal face of the portion of the air-conveying pipe that is situated facing the body to the internal face of the opposite portion of the air-conveying pipe.

15 Claims, 7 Drawing Sheets

(51) Int. Cl.
 *F01D 25/12* (2006.01)
 *F01D 25/24* (2006.01)
 *F02C 7/18* (2006.01)

(52) U.S. Cl.
 CPC .... *F05D 2220/323* (2013.01); *F05D 2250/17* (2013.01); *F05D 2250/26* (2013.01); *F05D 2250/75* (2013.01); *F05D 2260/201* (2013.01); *F05D 2260/232* (2013.01)

(58) Field of Classification Search
 CPC ............ F05D 2250/17; F05D 2250/26; F05D 2250/75; F05D 2260/232; F05D 2260/201
 See application file for complete search history.

(56) References Cited

U.S. PATENT DOCUMENTS

| | | | | |
|---|---|---|---|---|
| 6,149,074 | A * | 11/2000 | Friedel | F01D 11/24 239/127.1 |
| 7,597,537 | B2 * | 10/2009 | Bucaro | F01D 11/24 415/136 |
| 8,869,539 | B2 * | 10/2014 | Daguenet | F02C 7/20 60/796 |
| 9,869,196 | B2 * | 1/2018 | Day | F01D 11/24 |
| 10,578,114 | B2 * | 3/2020 | Regnard | F01D 25/30 |
| 10,619,511 | B2 * | 4/2020 | Bunel | F01D 25/12 |
| 2008/0089780 | A1 * | 4/2008 | Erickson | F01D 25/14 415/115 |
| 2014/0030066 | A1 * | 1/2014 | Schimmels | F01D 25/12 415/116 |
| 2014/0271103 | A1 * | 9/2014 | Tham | F01D 9/06 415/1 |
| 2017/0321568 | A1 * | 11/2017 | Werkheiser | F01D 11/20 |
| 2018/0128120 | A1 | 5/2018 | Prestel et al. | |
| 2018/0298758 | A1 * | 10/2018 | Cunningham | F01D 25/14 |
| 2019/0093559 | A1 * | 3/2019 | Bunel | F01D 25/14 |
| 2019/0136708 | A1 * | 5/2019 | Sebastian | F01D 11/24 |
| 2019/0170009 | A1 * | 6/2019 | Sen | F01D 25/08 |
| 2019/0390569 | A1 * | 12/2019 | Bun | F01D 11/24 |
| 2020/0362725 | A1 * | 11/2020 | Durand | F01D 25/12 |
| 2021/0095575 | A1 * | 4/2021 | Beltr N Par S | F01D 11/12 |
| 2021/0164362 | A1 * | 6/2021 | Morliere | F02C 7/18 |

* cited by examiner

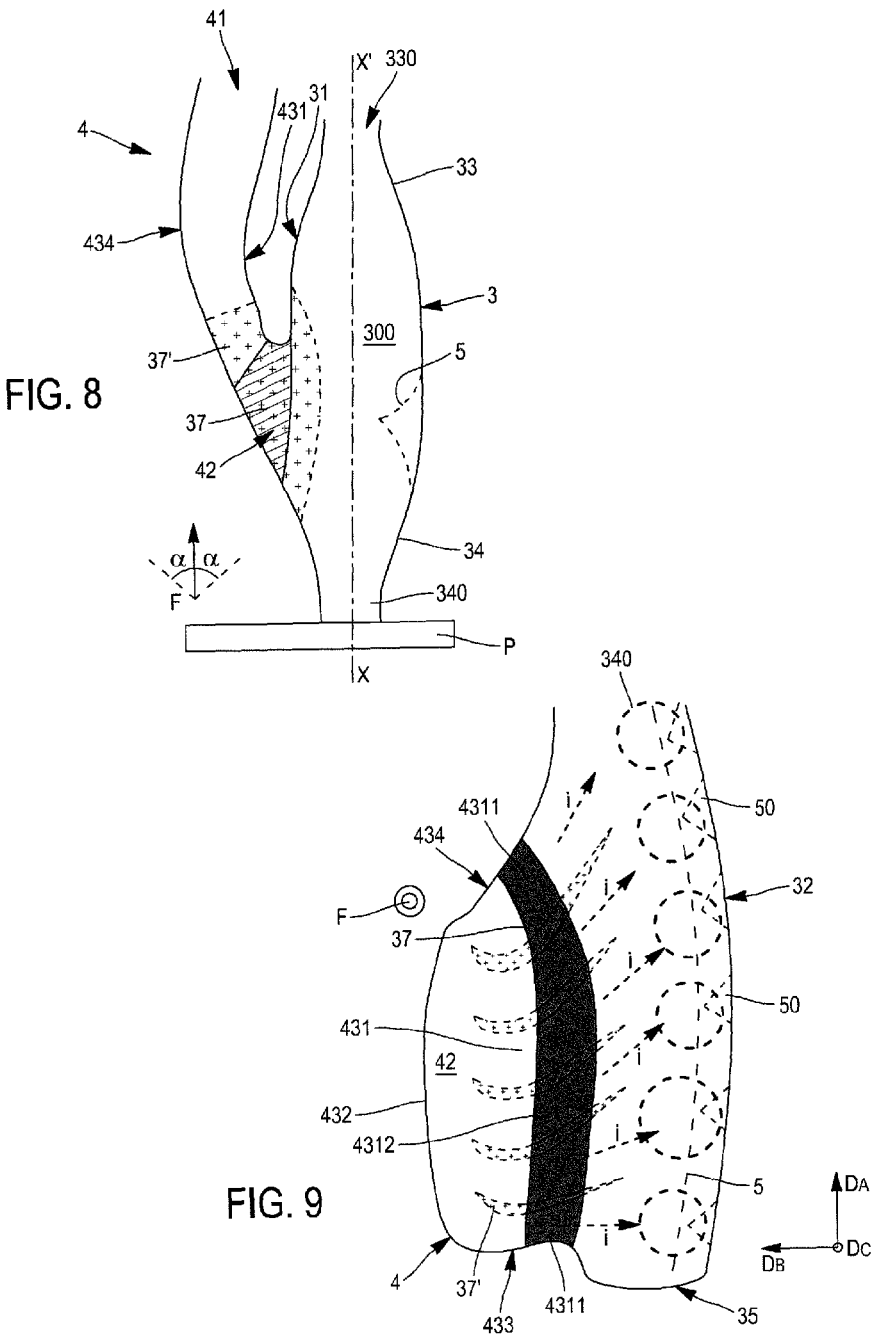

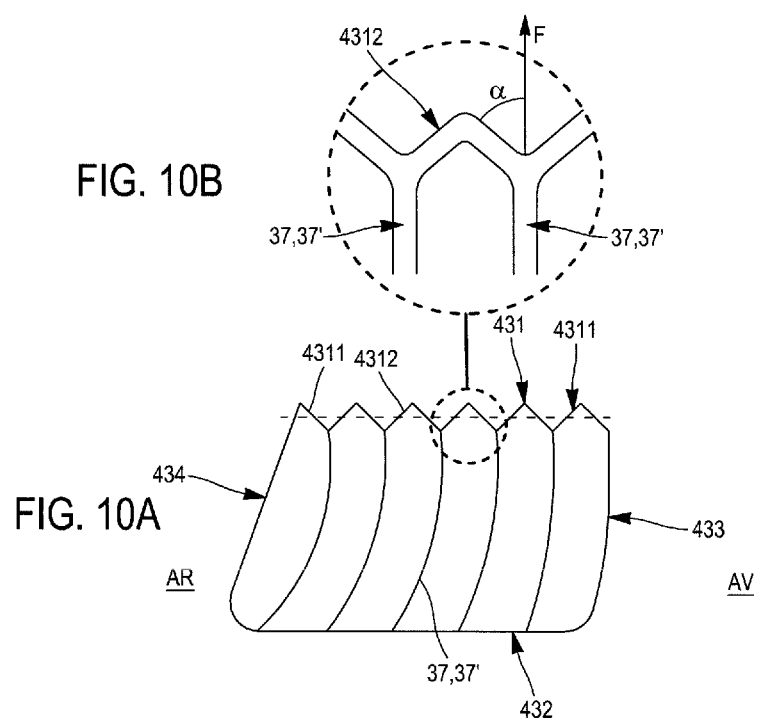
FIG. 10B
FIG. 10A
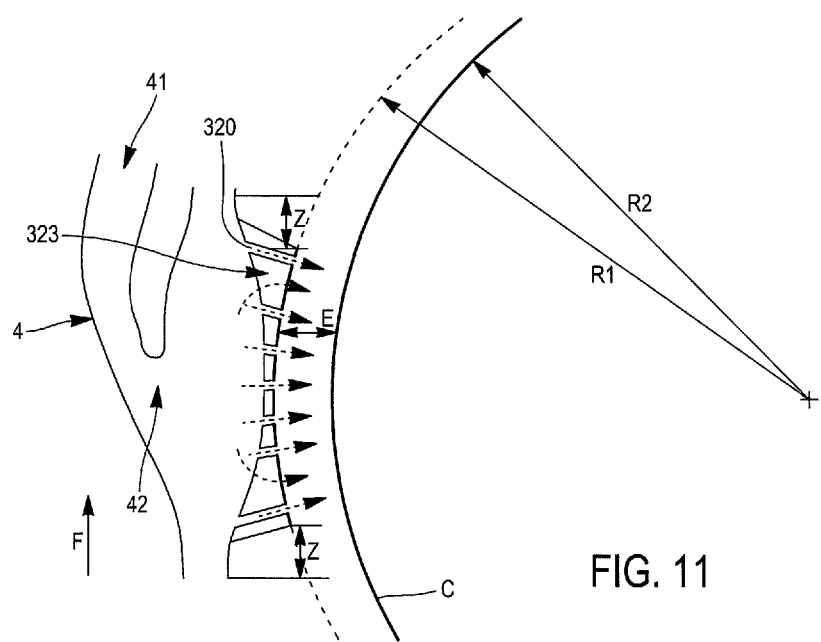
FIG. 11

PRESSURIZED-AIR SUPPLY UNIT FOR AN AIR-JET COOLING DEVICE

GENERAL TECHNICAL FIELD

The invention falls within the field of the cooling of a turbine casing, in particular a turbine of a turbomachine, such as a turbojet engine or a turboprop of an aircraft.

The present invention concerns more specifically a pressurized air supply unit of an air-jet cooling device cooling an outer turbine casing of a turbomachine, (in particular a low-pressure turbine), such a cooling device provided with such a unit, a turbomachine turbine equipped with this cooling device and finally an additive manufacturing method by laser fusion on a powder bed of such a unit.

STATE OF THE ART

Figure 1:
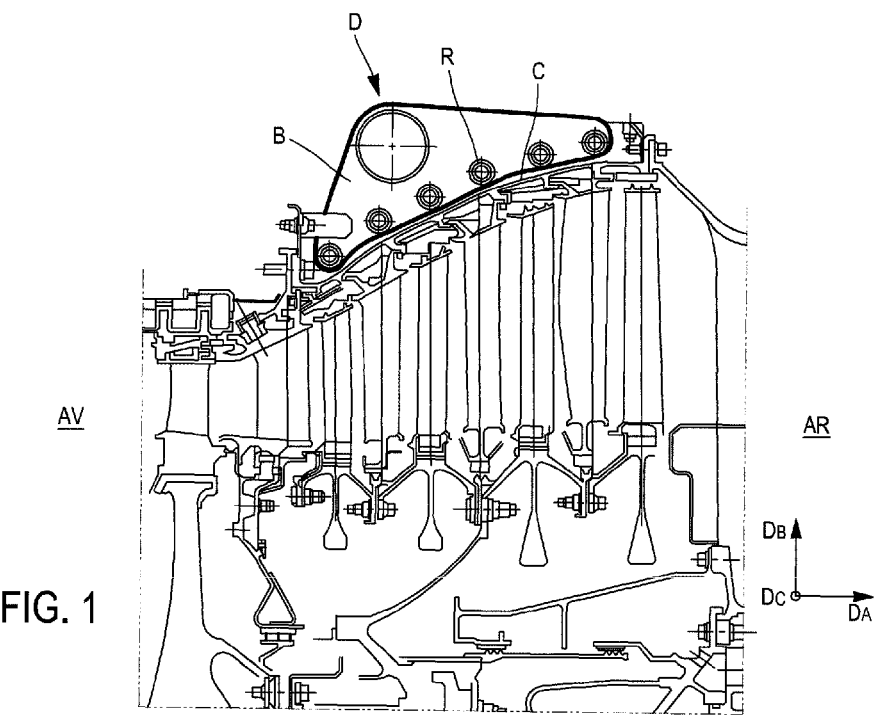
Figure 2:
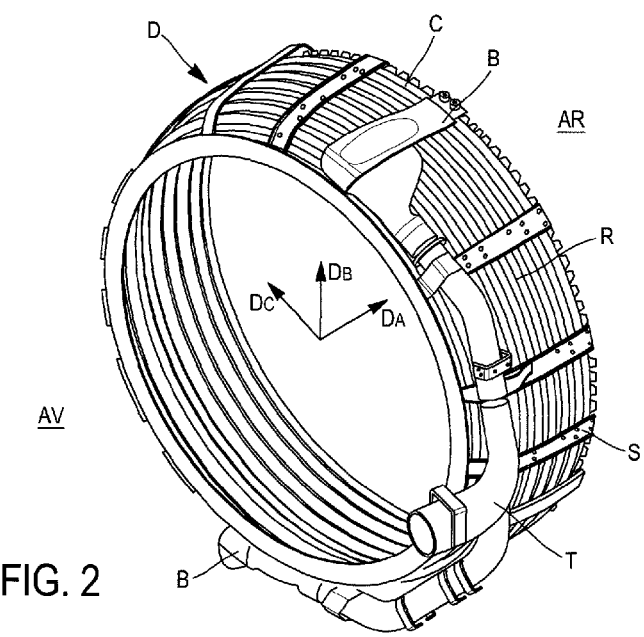

As can be seen in the attached FIGS. 1 and 2, which represent the state of the art, the turbine (here for example the low-pressure turbine) of a turbomachine is protected by an outer casing C of generally flared, substantially frusto-conical, shape. This casing is cooled by using the impingement cooling technology.

The casing C is equipped with a cooling device D. The device D comprises one or several pressurized air supply units B for, each of them being connected to several cooling manifolds R it supplies with air.

In the exemplary embodiment represented in these figures, the device D comprises two units B, positioned at approximately 180° from each other, (only one being visible in FIG. 1).

The units B are connected to a pressurized air supply source by a tube T. Different supports S ensure the holding of the manifolds R all around the casing C.

In these two figures and in the following ones, as well as in the description and the claims, the term "front" and the reference AV are used by reference to the front of the turbine and the term "rear" and the reference AR are used by reference to the rear of the turbine (relative to the direction of circulation of air thereinside).

Each cooling manifold R is pierced with a plurality of perforations which open out perpendicularly to the external surface of the casing C. The same applies to the unit B. The pressurized air traveling through these various perforations thus ensures a ventilation and an impingement cooling on the casing C.

However, for an air-jet impingement cooling to be effective, the air collected in the unit B must supply the manifolds R in a uniform and optimized manner, because otherwise there is a risk that areas of the casing C located facing some manifolds are less well cooled than other areas of the casing located facing other manifolds.

In addition, it is preferable to keep a constant air gap between the surface of the unit B provided with the perforations and the skin of the facing casing, to ensure uniform cooling.

However, this is not always the case with the units of the state of the art and this has a negative effect on the performances of the turbine and therefore of the turbomachine.

It is known from document FR 3050228 a pressurized air supply unit of an air-jet cooling device cooling an outer turbine casing of a turbomachine.

This unit comprises an air delivery elbow duct connected to a body delimiting an enclosure. This body has an external wall and an internal wall opposite to each other, this internal wall being provided with a plurality of air ejection perforations. In addition, the respective longitudinal edges of the two internal and external walls of the body meet to define a first series of outlet ducts located on a first longitudinal side of the body and a second series of an identical number of outlet ducts located on a second longitudinal side of the body, each outlet duct being configured to be connected to a cooling manifold of the cooling device.

However, such a unit is not unitary and therefore cannot be manufactured by an additive manufacturing method. In addition, it does not comprise air distribution partitions improving the distribution of air in the different manifolds.

Finally, in general, reducing the weight of the parts on board an aircraft is a constant objective in order to reduce fuel consumption and the associated costs.

PRESENTATION OF THE INVENTION

The aim of the invention is therefore to resolve the aforementioned drawbacks of the state of the art and to propose a pressurized air supply unit which allows obtaining a better distribution of air in the enclosure of the unit and therefore a better distribution of air in each cooling manifold it supplies.

To this end, the invention concerns a pressurized air supply unit of an air-jet cooling device cooling an outer turbine casing of a turbomachine, this unit comprising an air delivery elbow duct and a body delimiting an enclosure, this body having an external wall and an internal wall opposite to each other extending along an axial direction $D_A$, the internal wall of the body being provided with a plurality of air ejection perforations, the respective longitudinal edges of the two internal and external walls of the body meeting to define a first series of outlet ducts located on a first longitudinal side of the body and a second series of an identical number of outlet ducts located on a second longitudinal side of the body, each outlet duct being provided with an outlet opening configured to be connected to a cooling manifold of the cooling device, said air delivery elbow duct having an internal portion, an opposite external portion and two lateral portions, each lateral portion joining the internal portion to the external portion.

According to the invention, this unit is unitary, said air delivery elbow duct is connected to the external wall of the body so that its outlet mouth opens out into said enclosure and its internal portion is located opposite the part of the external wall of the body which extends towards the first side of said body, and the unit comprises at least one air distribution partition, disposed in the outlet mouth of the air delivery duct, this air distribution partition joining the inner face of the internal portion of the air delivery elbow duct to the inner face of the external portion of the air delivery elbow duct.

Thanks to these characteristics of the invention, air is better distributed in the unit and the distribution partition(s) contribute(s) to better distribute the air in the different cooling manifolds supplied from said unit.

The casing of the turbine is cooled better and therefore the performances of the engine are improved.

In addition, the specific shape of this air supply unit and its unitary nature allow its manufacture by an additive manufacturing method.

According to other advantageous and non-limiting characteristics of the invention, taken alone or in combination:
  the internal portion of the air delivery elbow duct has, at the level where the outlet mouth thereof connects to the external wall of the body, a V-shaped connection area which extends between the lateral portion of said air delivery duct and the air distribution partition located near this lateral portion and/or a V-shaped connection area, which extends between two neighboring air distribution partitions, along the axial direction of the unit, the tip of the V protruding into the space located between the internal portion of the air delivery duct and the part of the external wall of the body adjacent to said air delivery duct;

the air distribution partition extends inwardly of the air delivery duct and/or inwardly of the body;

the transverse edges of the two internal and external walls of the body meet at a rear end of the body and a front end of the body and in that the outlet mouth of the air delivery duct is connected to the front part of the external wall of the body located in the vicinity of said front end of the body and in that said air distribution partition is curved from the outlet mouth of the air delivery duct towards the rear end of the body;

said air distribution partition is curved from the internal portion of the air delivery duct towards the external portion of the air delivery duct and the rear end of the body;

each outlet duct has the shape of a funnel and the junction area between the internal wall of the body and the external wall of the body between two successive outlet openings of the same series of outlet ducts is in the shape of a hyperbolic paraboloid;

the unit comprises inside the body, at least one spout for circumferentially distributing the air stream, in the form of a lamella with a V-shaped cross section, which extends from the center or substantially from the center of the internal wall of the body, so that the tip of the V of said lamella protrudes in the enclosure of the body, this spout being provided with a plurality of notches authorizing the passage of air from the interior of the body towards the air ejection perforations;

the internal wall of the body comprises several strips forming an extra thickness of material, each strip extending from an outlet opening located on the first side of the body up to an outlet opening located on the second side of the body and with which it is aligned, the air ejection perforations are formed through said extra thickness strip, and this extra thickness strip is curved along a circular arc shape whose radius is greater than the radius of the circular section of the casing to be cooled facing which said extra thickness strip is intended to be positioned;

the transverse edges of the two internal and external walls of the body meet at a rear end of the body and a front end of the body and said unit has at its rear end and/or its front end, an element for fastening the unit on the casing to be cooled, such as a fastening lug or a fastening flange;

the different walls of the body and of the air delivery duct have a maximum angle of 50° with respect to a reference axis of the unit joining the center of an outlet opening of an outlet duct on the second longitudinal side of the body to the center of an outlet opening of an outlet duct on the first longitudinal side of the body, located oppositely.

The invention also concerns an air-jet cooling device cooling an outer turbine casing of a turbomachine.

According to the invention, this device comprises a plurality of perforated, curved cooling manifolds configured to be disposed around said outer turbine casing and at least one pressurized air supply unit as mentioned above, the outlet openings of this unit being connected to the ends of said cooling manifolds, so as to allow the pressurized air supply thereto.

The invention also concerns a turbine in particular a low-pressure turbine of a turbomachine, such as a turbojet engine or a turboprop of an aircraft, comprising an outer casing. It comprises an air-jet cooling device cooling this casing as mentioned above.

Finally, the invention concerns an additive manufacturing method by laser fusion on a powder bed of a pressurized air supply unit as mentioned above. According to the invention, this method comprises a step of depositing on a horizontal support a powder bed of the material constituting said unit, then of scanning by laser beam some points of this powder bed in order to melt said powder and cure it and this step is repeated until obtaining said pressurized air supply unit, these different successive powder layers being disposed in planes perpendicular to a vertical manufacturing direction, this vertical manufacturing direction being parallel or substantially parallel to a reference axis of the unit joining the center of an outlet opening of an outlet duct on the second longitudinal side of the body to the center of an outlet opening of an outlet duct on the first longitudinal side of the body, located oppositely, the manufacture of the unit starting with the outlet ducts on the second longitudinal side of the body.

Thanks to this additive manufacturing method, it is possible to obtain a thinner and therefore lighter unit.

PRESENTATION OF THE FIGURES

Other characteristics and advantages of the invention will appear from the following description thereof with reference to the appended drawings which represent, by way of indication but without limitation, a possible embodiment.

Figure 3:
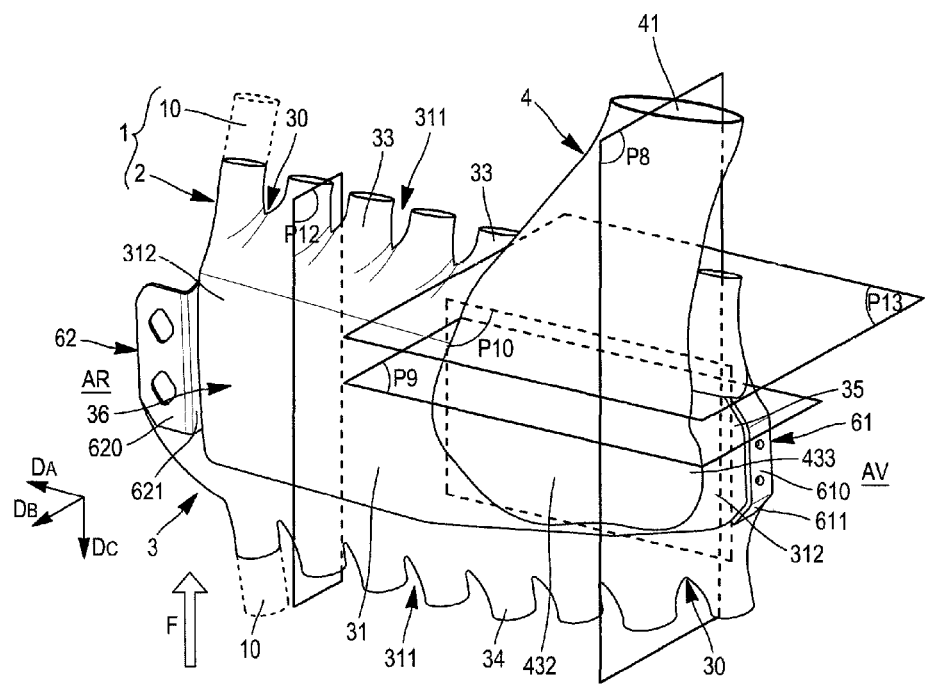
Figures 4, 5:
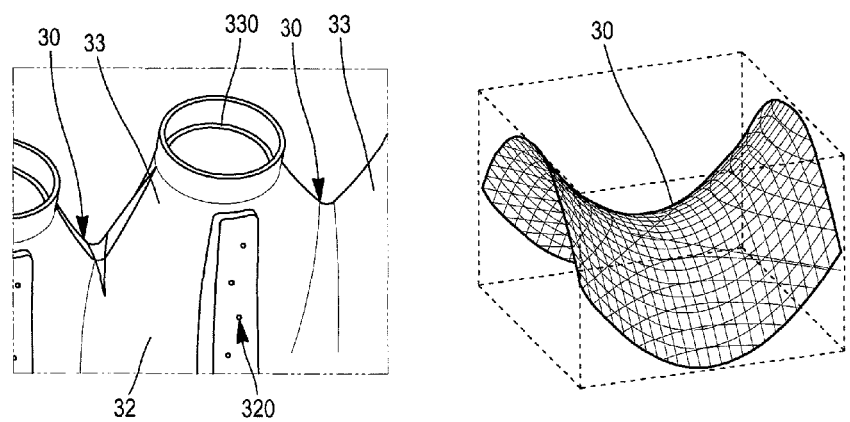
Figure 6:
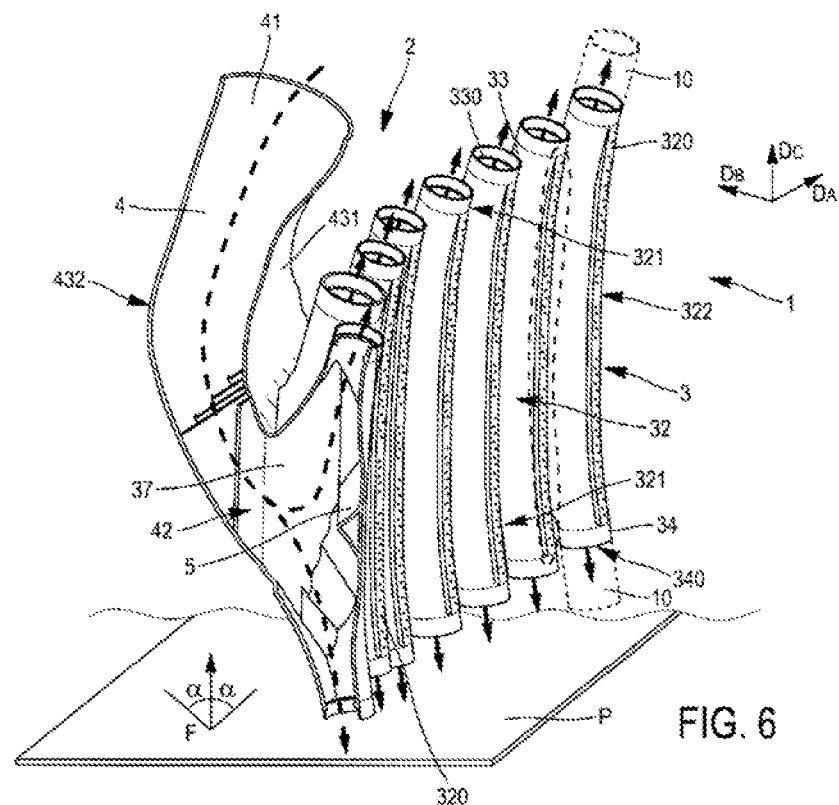
Figure 7:
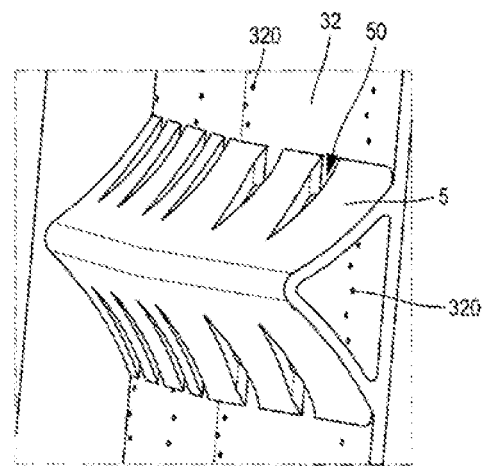
Figure 12:
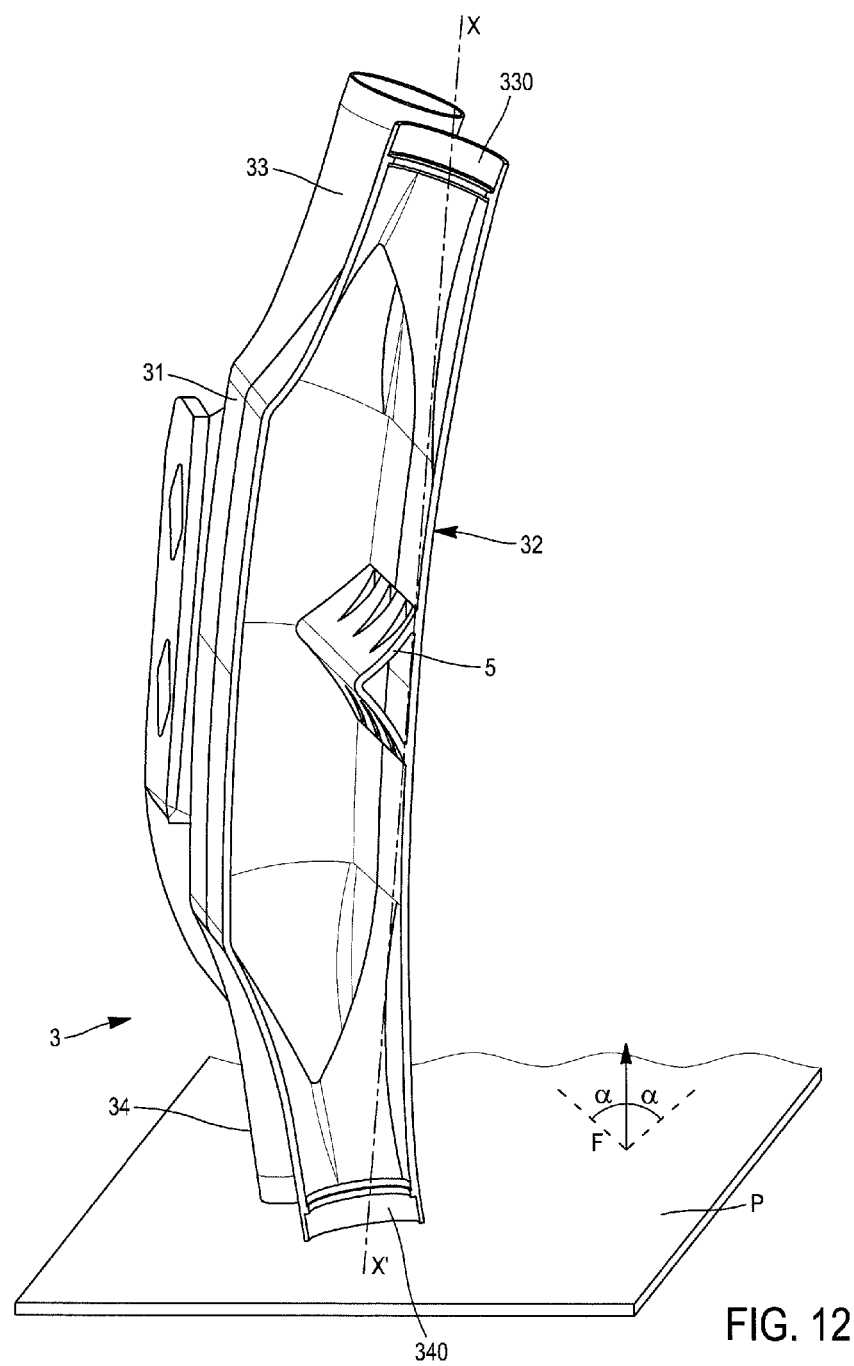
Figure 13:
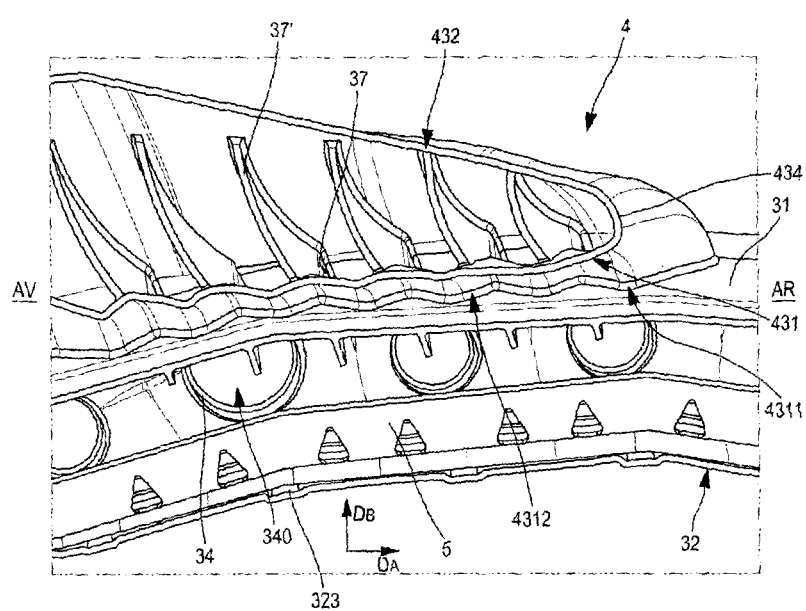

In those drawings:

FIG. 1 is an axial longitudinal sectional view of a low-pressure turbine equipped with an air-jet cooling device according to the state of the art, FIG. 2 is a perspective view of the cooling device of FIG. 1, arranged around the casing of the low-pressure turbine, FIG. 3 is a perspective view of the cooling unit according to the invention, FIG. 4 is a detailed view of part of the outlet ducts of FIG. 3, FIG. 5 is a detailed view of the intersection area between two outlet ducts of FIG. 4, FIG. 6 is a perspective and partial sectional view of the cooling unit of FIG. 3, at another angle of view, FIG. 7 is a detailed and perspective view of the spout for circumferentially distributing the air stream, disposed inside the cooling unit according to the invention, FIGS. 8 to 10A are respectively side, top and front schematic sectional views of the cooling unit according to the invention, taken along the section planes referenced P8, P9 and P10 in FIG. 3, FIG. 10B is a detailed view of FIG. 10A, FIG. 11 is a schematic view representing the sectional cooling unit according to the invention placed in front of the casing to be cooled, FIG. 12 is a perspective view of part of the unit cut along the section plane referenced P12 in FIG. 3, and FIG. 13 is a sectional top view of the cooling unit according to the invention, taken along the section plane referenced P13 in FIG. 3.

DETAILED DESCRIPTION OF THE INVENTION

The pressurized air supply unit 2 according to the invention is an element of an air-jet cooling device 1 cooling an outer turbine casing of a turbomachine.

The cooling device 1 also comprises a plurality of perforated cooling manifolds 10, curved in a circular arc portion and disposed around the outer casing C of the turbine as described previously in relation with FIGS. 1 and 2. In FIGS. 3 and 6, only two portions of manifolds 10 have been represented for simplification purposes.

In FIGS. 1 and 2, the arrows $D_A$, $D_B$ and $D_C$ respectively indicate the axial direction, the radial direction and the circumferential direction of the turbine and the casing.

The unit 2 is intended to replace the unit B represented in FIGS. 1 and 2 and to be positioned like the latter with respect to the casing of the turbine. The reference frame of the directions has therefore been transferred in FIGS. 3, 6 and 9 to show the orientation of the unit 2.

The unit 2 is unitary, that is to say it is made in one piece, without welding or assembly of different parts. However, in order to be able to describe it, it is considered that it comprises several sub-assemblies which will be described in more detail.

Preferably, the unit 2 is manufactured by an additive manufacturing method by laser fusion on a powder bed and its shape has been designed accordingly.

The unit 2 comprises a body 3 delimiting an enclosure 300 and an air delivery elbow duct 4 (bent duct) (see FIG. 8).

As can be seen in FIGS. 3, 6 and 12, the body 3 has two opposite walls, namely an external wall 31 and an internal wall 32, the latter being called so because it is intended to be positioned facing the external surface of the casing C to be cooled and because it is turned inwardly of the turbine.

The internal wall 32 is pierced with air ejection perforations 320.

The body 3 has a generally elongated shape. One of the two longitudinal edges 311 of the external wall 31 meets one of the two longitudinal edges 321 of the internal wall 32, so as to define a first series of outlet ducts 33, located on a first longitudinal side of the body 3 and the other of the two longitudinal edges 311 of the external wall 31 meets the other of the two longitudinal edges 321 of the internal wall 32, so as to define a second series of an identical number of outlet ducts 34, located on a second longitudinal side of the body 3.

Thus, for example in FIGS. 3 and 6, each series comprises eight outlet ducts 33 and eight outlet ducts 34.

Each outlet duct 33 is substantially aligned with an outlet duct 34 located oppositely, with which it forms a pair of ducts.

In order to facilitate the flow of air streams and reduce head losses, the geometries of the surfaces of the ducts 33 and 34 are smoothed, that is to say their sections evolve gradually up to the respective outlet openings 330, 340 of each outlet duct 33, 34.

Thus, preferably, the ducts 33, 34 have the shape of a funnel which narrows up to the outlet openings 330, 340, this shape being visible on the ducts 33 of FIG. 4. Also preferably, the junction areas 30 between the internal wall 32 and the external wall 31 of the body 3, in the space between two successive outlet ducts 33 or 34 of the same series of ducts, have the shape of a hyperbolic paraboloid, as can be seen in the FIG. 5.

Thanks to these specific shapes, a very good flow of the air streams is obtained while being compatible with the manufacturing angles of an additive manufacturing method on a powder bed, which will be described later.

In addition, this geometry allows having an optimized thickness of the unit 2 and reducing the overall mass of the unit while having good mechanical strength thereof, including between two neighboring outlet ducts.

The outlet openings 330 or 340 are preferably of circular cross section and their internal diameter corresponds to the external diameter of the cooling manifolds 10. Thus, these manifolds can be welded into the outlet openings.

Furthermore, one of the two transverse edges 312 of the external wall 31 meets one of the two transverse edges 322 of the internal wall 32, so as to define one end 35, called "front" end, of the body 3 and the other of the two transverse edges 312 of the external wall 31 meets the other of the two transverse edges 322 of the internal wall 32, so as to define an end 36, called "rear" end, of the body 3. The designations "front" and "rear" are given with reference to the front AV and rear AR ends of the turbine when the unit 2 of the cooling device 1 is positioned around the casing of said turbine.

The air delivery duct 4 has an inlet mouth 41 and an outlet mouth 42. It is bent in the vicinity of its outlet mouth 42, as best seen in FIGS. 6 and 8. Preferably, it flares widthwise from its inlet mouth 41 to its outlet mouth 42, as seen in FIG. 3.

The inlet mouth 41 is preferably of circular section. It is intended to be connected to a pressurized air supply source, not represented in the figures.

The flared outlet mouth 42 is connected to the external wall 31 of the body 3 at the level of an inlet mouth 38 (see FIG. 8) formed in this external wall 31, so that the duct 4 is in fluid communication with the interior of the body 3. In the embodiment of FIG. 3, this connection is made in the front part of the external wall 31. However, the outlet mouth 42 could be more flared and the connection would then be made from the front part to the rear part of the external wall 31.

Also preferably, the outlet mouth 42 of the air delivery duct 4 opens out into the body 3 halfway between the outlet openings 330, 340.

Conventionally, it is considered that the wall constituting said duct 4 has four longitudinal portions, namely an internal portion 431, an opposite external portion 432 and two lateral portions 433, 434 joining the internal portion to said external portion. These portions are best seen in FIG. 10A. The internal portion 431 extends facing the external wall 31 of the body 3 and more specifically, due to the bent shape of the duct 4, facing the part of the external wall 31 which extends towards the first side of the body 3 where the outlet ducts 33 of the first series of ducts are located (ducts turned upward in FIG. 6).

In order to direct and best distribute the air coming from the duct 4 towards the different outlet ducts 33, 34 of the body 3, at least one partition 37 for axially distributing (along the axial direction $D_A$) the air is provided inside the outlet mouth 42 of the air delivery duct 4. Preferably, there are several partitions 37, (for example five in FIGS. 9 and 10).

As can be seen in FIG. 8, according to a first embodiment, each partition 37 extends at least from the inner face of the internal portion 431 of the air delivery duct 4 up to the inner face of the external portion 434 of the duct 4 (surface represented in hatched lines in the FIGS. 8 and 9).

According to a second embodiment, each partition, then referenced 37', extends more widely inwardly of the duct 4 and/or inwardly of the body 3. In FIG. 8, the partition 37' extends from the inner face of part of the internal portion 431 of the air delivery duct 4 and the external wall 31 of the first side of the body 3 up to the inner face of the external portion 434 of the duct 4 (surface represented with crosses between the two dotted lines in FIGS. 8 and 9).

In addition, advantageously, and as can be seen in FIGS. 9 and 13, each partition 37, 37' is curved from the outlet mouth 42 of the air delivery duct 4 towards the internal wall 32 of the body 3 and the rear end 36 of the body 3.

Also preferably, and as can be seen in FIGS. 10A and 13, each partition 37, 37' is curved from the internal portion 431 towards both the external portion 432 and the rear end of the body 3 (on the left in the FIG. 10A).

This aerodynamic shape of the partitions 37, 37' promotes the guiding of the air streams (symbolized by the arrows i in FIGS. 6 and 9), allows reducing the head losses and distributing the streams in a controlled manner towards the different outlet openings 330, 340. It is easily understood that the number, orientation and 3D geometry of each partition 37, 37' can be adapted to best distribute the air stream according to the number of manifolds to be supplied and the desired space requirement of the unit 2.

As mentioned above, the unit 2 is advantageously manufactured by additive manufacturing by laser fusion on a powder bed. It is preferably made of metal, for example Inconel 718.

The additive manufacturing is carried out by depositing successive layers on a horizontal support P represented partially in FIGS. 6 and 12 and schematically in FIG. 8.

More specifically, a layer of a powder of the material constituting the unit 2 is disposed on the support P then the powder is melted at some points by scanning using a laser beam. This step is repeated until obtaining the unit 2.

The construction direction is vertical and the direction of construction of the unit 2 is represented by the vertical arrow F from bottom to top.

It will be noted that the vertical construction direction is parallel or substantially parallel to a reference axis X-X' represented in FIG. 12 and which joins the center of an outlet opening 340 of a duct 34 on the second longitudinal side of the body 3 to the center of an outlet opening 330 of a duct 33 on the first longitudinal side of the body 3, located oppositely (in other words which joins the centers of the two openings of a pair of ducts).

The construction begins with the ducts 34 (at the bottom in FIG. 12).

In order to guarantee the feasibility of the unit 2 by such an additive manufacturing method, it is preferable that the internal 32, external 31 walls of the body 3 and the different portions 431 to 434 of the duct 4 form relative to the vertical direction of construction, an angle α equal to at most 50°, which allows avoiding any support during the manufacture or a machining of superfluous parts after manufacture. In other words, all the walls should not exceed this angle of 50° so as not to be too horizontal and risk not being supported by the layer of unfused powder located below. In other words also, the different walls of the unit 2 form at most an angle α of 50° with the aforementioned reference axis X-X'.

In addition, the partitions 37, 37' allows supporting the interior portion 431 of the duct 4 which is located above (represented in gray in FIG. 9 and visible in FIG. 10A).

More specifically, and as can be seen in FIGS. 10A and 10B, at the connection of the mouth 42 on the external wall 31, the internal portion 431 has several V-shaped connection areas, namely a V-shaped connection area 4311 between the lateral portion 433, respectively 434, of the duct 4 and the air distribution partition 37, 37' located nearby. If there are at least two partitions 37, 37', the portion 431 also has a V-shaped connection area 4312 between two neighboring partitions 37, 37'.

These V-shaped connection areas are also visible in FIG. 13. They extend along the axial direction $D_A$.

The tip of the V is protruding towards the space formed between the duct 4 and the body 3 (to the top of FIG. 6). This space has also a V or U shape and extends in the radial direction $D_B$.

Finally, the sections of each side of the V form an angle α of at most 50° relative to the vertical direction of manufacture (see the angle relative to the arrow F).

The inverted V forms a kind of vault which can also be manufactured by additive manufacturing without additional support.

As can be seen in the sectional view of FIG. 8, the outlet mouth 42 of the air delivery duct 4 is connected to the external wall 31 of the body 3 in an inclined manner, so that it tends to guide the air further towards the outlet ducts 34 on the second side (to the bottom of the figure). Advantageously, and in order to compensate for the aforementioned phenomenon, the unit 2 comprises a spout 5 for circumferentially distributing the air stream, disposed inside the body 3 and which tends to force the flow of part of the air stream towards the first side (to the top in FIG. 8), to better balance the distribution of the streams on either side of the unit 2.

This spout 5 has the shape of a lamella folded in two, with a V-shaped cross section, disposed in the center or substantially in the center of the internal wall 32 of the body 3, so that the tip of the V protrudes inwardly of the body.

This spout 5 preferably extends from the front end to the rear end of the body 3 (see also FIG. 12).

This spout 5 is provided with a plurality of notches 50 which authorize the circulation of air from the interior of a body 3 towards the air ejection perforations 320 and which allow removing powder from the part i.e. to effectively remove, at the end of manufacture, the layers of powder located between the spout 5 and the wall 32 and which have not been fused by the laser beam.

The shape of this spout 5 and its angles of inclination relative to the vertical direction of construction F are compatible with an additive manufacturing method (less than 50°).

As mentioned above, the internal wall 32 of the body 3 has air ejection perforations 320 which put the interior of said body in communication with the casing C to be cooled.

These perforations 320 are aligned in the form of at least one line of perforations which extends for each pair of outlet openings, from an outlet opening 330 located on the first side of the body 3 up to the outlet opening 340 located on the second side of the body 3. Preferably, and as can be seen in FIG. 4, there are two parallel perforation lines whose perforations 320 are offset by half a pitch.

Preferably, and in order to further improve the efficiency of the air-jet cooling, the internal wall 32 of the body 3 has strips 323 forming an extra thickness of material, each strip 323 extending from an outlet opening 330 to an outlet opening 340 of the same pair of outlet openings.

As can be seen in FIG. 11, the internal surface of this extra thickness strip 323 (i.e. the surface turned towards the casing C) is curved from the opening 330 to the opening 340 in a circular arc shape whose radius R1 is greater than the radius R2 of the circular section of the casing C to be cooled located oppositely. The perforations 320 are formed through this extra thickness strip of material 323.

A constant air gap E is thus obtained between the outlet of the perforations 320 and the casing C. In addition, the perforations 320 thus extend over a larger part of the casing 2 and the uncooled areas Z of the casing C are reduced.

Finally, advantageously, and as can be seen in FIG. 3, the front end 35 and/or the rear end 36 of the unit 3 is provided with an element for fastening 6 the unit 2 on the casing C to be cooled.

This fastening element 6 is for example a flange 61 or a fastening lug 62. It is unitary with the body 3.

Preferably, the fastening flange 61 and the fastening lug 62 have a planar portion 610, respectively 620, allowing the fastening on a planar surface. In addition, the junction parts 611, respectively 621, between the planar portion 610, respectively 620, and the body 3 are formed with angles compatible with an additive manufacturing without additional construction support.

The invention claimed is:

1. A pressurized air supply unit of an air-jet cooling device cooling an outer turbine casing of a turbomachine, this unit comprising an air delivery elbow duct and a body delimiting an enclosure, this body having an external wall and an internal wall opposite to each other extending along an axial direction, the internal wall of the body being provided with a plurality of air ejection perforations, the respective longitudinal edges of the two internal and external walls of the body meeting to define a first series of outlet ducts located on a first longitudinal side of the body and a second series of an identical number of outlet ducts located on a second longitudinal side of the body, each outlet duct being provided with an outlet opening configured to be connected to a cooling manifold of the cooling device, said air delivery elbow duct having an internal portion, an opposite external portion and two lateral portions, each lateral portion joining the internal portion to the external portion, wherein this unit is unitary, wherein said air delivery elbow duct is connected to the external wall of the body so that an outlet mouth of the air delivery elbow duct opens out into said enclosure and that its internal portion is located opposite the part of the external wall of the body which extends towards the first side of said body, and wherein the unit comprises at least one air distribution partition disposed in the outlet mouth of the air delivery duct, this air distribution partition joining an inner face of the internal portion of the air delivery elbow duct to an inner face of the external portion of the air delivery elbow duct.

2. The pressurized air supply unit according to claim 1, wherein the internal portion of the air delivery elbow duct has, at the level where the outlet mouth thereof connects to the external wall of the body, a V-shaped connection area which extends between the lateral portion of said air delivery duct and the air distribution partition located near this lateral portion and/or a V-shaped connection area, which extends between two neighboring air distribution partitions, along the axial direction of the unit, a tip of the V of the V-shaped connection areas protruding into the space located between the internal portion of the air delivery duct and the part of the external wall of the body adjacent to said air delivery duct.

3. The pressurized air supply unit according to claim 1, wherein the air distribution partition extends inwardly of the air delivery duct and/or inwardly of the body.

4. The pressurized air supply unit according to claim 1, wherein the transverse edges of the two internal and external walls of the body meet at a rear end of the body and a front end of the body and wherein the outlet mouth of the air delivery duct is connected to a front part of the external wall of the body located in the vicinity of said front end of the body and wherein said air distribution partition is curved from the outlet mouth of the air delivery duct towards the rear end of the body.

5. The pressurized air supply unit according to claim 4, wherein said air distribution partition is curved from the internal portion of the air delivery duct towards the external portion of the air delivery duct and the rear end of the body.

6. The pressurized air supply unit according to claim 1, wherein each outlet duct has the shape of a funnel and wherein a junction area between the internal wall of the body and the external wall of the body between two successive outlet openings of the same series of outlet ducts is in the shape of a hyperbolic paraboloid.

7. The pressurized air supply unit according to claim 1, wherein it comprises inside the body, at least one spout for circumferentially distributing the air stream, in the form of a lamella with a V-shaped cross section, which extends from a center or substantially from a center of the internal wall of the body, so that the tip of the V of said lamella protrudes in the enclosure of the body, this spout being provided with a plurality of notches authorizing the passage of air from the interior of the body towards the air ejection perforations.

8. The pressurized air supply unit according to claim 1, wherein the internal wall of the body comprises several strips forming an extra thickness of material, each strip extending from an outlet opening located on the first side of the body up to an outlet opening located on the second side of the body and with which it is aligned, wherein the air ejection perforations are formed through said extra thickness strip, and wherein this extra thickness strip is curved along a circular arc shape whose radius is greater than the radius of a circular section of the casing to be cooled facing which said extra thickness strip is intended to be positioned.

9. The pressurized air supply unit according to claim 1, wherein the transverse edges of the two internal and external walls of the body meet at a rear end of the body and a front end of the body and wherein said unit has at its rear end and/or its front end, an element for fastening the unit on the casing to be cooled.

10. The pressurized air supply unit according to claim 1, wherein the different walls of the body and of the air delivery duct have a maximum angle of 50° with respect to a reference axis of the unit joining a center of an outlet opening of an outlet duct on the second longitudinal side of the body to a center of an outlet opening of an outlet duct on the first longitudinal side of the body, located oppositely.

11. An air-jet cooling device cooling an outer turbine casing of a turbomachine, wherein it comprises a plurality of perforated, curved cooling manifolds configured to be disposed around said outer turbine casing and at least one pressurized air supply unit according to claim 1, the outlet openings of this unit being connected to the ends of said cooling manifolds, so as to allow the pressurized air supply thereto.

12. A turbine of a turbomachine, comprising an outer casing, wherein it comprises an air-jet cooling device cooling this casing according to claim 11.

13. An additive manufacturing method by laser fusion on a powder bed of a pressurized air supply unit according to claim 1, wherein it comprises a step of depositing on a horizontal support a powder bed of the material constituting said unit, then of scanning by laser beam some points of this powder bed in order to melt said powder and cure it and wherein this step is repeated until obtaining said pressurized air supply unit, these different successive powder layers being disposed in planes perpendicular to a vertical manufacturing direction, this vertical manufacturing direction being parallel or substantially parallel to a reference axis of the unit joining the center of an outlet opening of an outlet duct on the second longitudinal side of the body to the center of an outlet opening of an outlet duct on the first longitudinal side of the body, located oppositely, the manufacture of the unit starting with the outlet ducts on the second longitudinal side of the body.

14. The pressurized air supply unit according to claim 9, wherein the element for fastening the unit on the casing to be cooled is a fastening lug or a fastening flange.

15. A turbine according to claim 12 which is a low-pressure turbine.

* * * * *